US007421918B2

(12) United States Patent
Cable et al.

(10) Patent No.: US 7,421,918 B2
(45) Date of Patent: Sep. 9, 2008

(54) DIFFERENTIAL ADJUSTMENT APPARATUS

(75) Inventors: Alex Ezra Cable, Newton, NJ (US); Jason Matthew Mills, Blairstown, NJ (US)

(73) Assignee: Thorlabs, Inc., Newton, NJ (US)

( * ) Notice: Subject to any disclaimer, the term of this patent is extended or adjusted under 35 U.S.C. 154(b) by 782 days.

(21) Appl. No.: 10/672,922

(22) Filed: Sep. 26, 2003

(65) Prior Publication Data

US 2005/0066763 A1 Mar. 31, 2005

(51) Int. Cl.

| | |
|---|---|
| ***F16H 21/54*** | (2006.01) |
| ***F16H 21/44*** | (2006.01) |
| ***F16H 25/18*** | (2006.01) |
| ***G05G 1/08*** | (2006.01) |
| ***G02B 21/26*** | (2006.01) |

(52) U.S. Cl. ........................... 74/110; 74/504; 359/392

(58) Field of Classification Search .................. 74/504, 74/110, 665; 29/426.5; 251/230; 333/232; 81/121.1, 44, 124.4, 124.5; *B25B 13/48*
See application file for complete search history.

(56) References Cited

U.S. PATENT DOCUMENTS

| | | | | |
|---|---|---|---|---|
| 2,694,332 | A * | 11/1954 | Stranberg | 81/121.1 |
| 3,444,486 | A * | 5/1969 | Stepura et al. | 333/232 |
| 4,445,758 | A * | 5/1984 | Emmel | 359/392 |
| 4,617,833 | A * | 10/1986 | Hall et al. | 74/110 |
| 5,121,655 | A * | 6/1992 | Toshimitsu | 74/665 B |
| 5,456,448 | A * | 10/1995 | Chou | 251/230 |
| 5,617,624 | A * | 4/1997 | Walker | 29/426.5 |
| 6,186,016 | B1 * | 2/2001 | Cable | 74/110 |

FOREIGN PATENT DOCUMENTS

GB 2 200 065 A * 7/1988

OTHER PUBLICATIONS

Melles Griot, "Research-Grade Gimbal Mirror/Beamsplitter Mounts"; available online at www.mellesgriot.com; 3 pages.
OptoSigma Catalog, "Close-proximity Mirror Mounts", Aug. 29 2007, Product Catalog online at www.optosigma.com; 2 pages.

* cited by examiner

*Primary Examiner*—Vinh T. Luong
(74) *Attorney, Agent, or Firm*—Finnegan, Henderson, Farabow, Garrett & Dunner, L.L.P.

(57) ABSTRACT

A differential adjuster that utilizes a tool interface for affecting either a coarse adjustment or a fine adjustment is presented. The differential adjuster includes an intermediate actuator sleeve with a tool interface to accommodate a tool for performing adjustments. The intermediate actuator sleeve includes a first threaded surface operatively engaging a housing to adjust the position of the intermediate actuator sleeve relative to the housing, and a second threaded surface operatively engaging a push rod to adjust the position of the intermediate actuator sleeve relative to the push rod. The first threaded surface contains threads that are a different pitch than the second threaded surface.

34 Claims, 5 Drawing Sheets

DIFFERENTIAL ADJUSTMENT APPARATUS

BACKGROUND

1. Technical Field

The present invention relates to differential adjusters, and, in particular, to a miniaturized differential adjustment apparatus that allows for minute, precise adjustments, for example, of optical components mounted in an adjustable mechanical mount used for precision alignment.

2. Discussion of Related Art

Investigations of optical phenomena and testing of optical systems often require increasingly precise orientations of optical elements such as mirrors, lenses, filters, optical fibers, and other optical elements. Research into optical transmission of data, for example, requires precisely oriented components to manipulate light of various wavelengths into and out of optical wave-guides, which may have core sizes of less than about 0.010 mm. In research environments, various components, for example mirrors, filters and/or lenses, can be mounted on an optical mount for use on an optics table. Considerable effort is often expended in obtaining a proper optical adjustment of the optical components to facilitate the desired optical alignment. As optics technology evolves, the number of optical elements per unit volume grows, and the tolerances on the alignment of the individual optical components becomes smaller, hence requiring more precise alignment devices that occupy smaller volumes.

Highly accurate positional adjustments are also utilized in other areas, for example the micro-manipulation of biological samples. High positioning accuracy can facilitate precise positioning of samples being viewed under high magnification, or the positioning of various probes. Similar high precision requirements are also found in semiconductor manufacturing because as the feature size of the integrated circuits shrinks, the need for micro-positioning tools grows.

Adjustment of these various components can often be accomplished with screw-based adjusters. These adjusters may be mounted on holders for the respective component to be adjusted or may be utilized in translation-type mounts, typically referred to as XYZ translation stages. Within the optical sciences, which is typical of other fields as well, the holders are then attached to, or are a part of, larger systems or optical assemblies. Very fine and/or precise adjustments often utilize differential adjusters, which utilize two different threads arranged such that the net linear movement affected is a result of the difference in the pitch of the two different threads.

However, typical differential adjuster designs in the market are too large and bulky to be of practical use in miniature mechanical devices such as mirror mounts or fiber optic alignment systems. The relatively large mass and long lever arm of the typical differential adjuster, when mounted in a relatively small mechanical device such as a mirror mount, introduce significant problems in addition to just the simple problem of occupying too much space. For example, when a user touches the adjuster, its long length provides a lever arm that introduces a torque that disturbs the mount, which in turn disturbs the alignment of the mirror, causing the reflected light field reflected off the mirror to move erratically. This erratic motion inhibits the ability of the user to take full advantage of the high sensitivity of the adjuster/mount combination. In some cases, such erratic movement of the beam may result in a hazardous environment, potentially causing damage to equipment and injury to personnel.

In the past the erratic motion resulting from handling of the adjuster has been overcome by utilizing large steel mounts to provide the necessary rigidity. Opto-Sigma of Santa Ana, Calif., for example, offers a 1" mirror mount with differential adjusters, model number 1125591, that weighs approximately 0.29 kg. Melles Griot of Carlsbad, Calif. offers a 1" mirror mount with differential adjusters, model number 07-MAD-001, that weighs approximately 0.29 kg. Typically a 1" mirror would not be used when building a miniaturized optical system, however, because differential adjusters have in the past been so large as to make it impractical to use them on mirror mounts that are designed for smaller optics, suppliers for smaller mirror mounts that are offered with differential adjusters have not been located.

In addition, differential adjusters in the art may include, and are controlled by, two knobs, one used to adjust the coarse portion of the adjuster and one to adjust the fine portion of the adjuster. Incorporating multiple knobs into the differential adjuster increases the bulk and size of the overall adjuster, and further exacerbates the problems discussed above. In some systems, mounts utilizing adjusters have been bulky and heavy in order to offset the deficiencies in the adjuster. This solution results in bulky and heavy mounts that are difficult to arrange in high density optical systems.

Therefore, there is a need for small differential adjusters that can accommodate precise alignment of optical components without themselves becoming a source of difficulty for alignment.

SUMMARY

In accordance with the present invention, a differential adjuster ("adjuster") is presented that can be miniaturized and incorporated in an assembly with a component holder and/or a component mount such that it does not dramatically increase the overall size and/or weight of the assembly. The small form factor of the differential adjuster is accomplished by utilizing a tool, such as a screwdriver or hex wrench, for example, to activate the differential drive mechanism of the adjuster, thus eliminating the need for at least one large and/or bulky knob. The use of a tool for activating the drive mechanism also decreases the amount of force that is transmitted from the hand of the user to the device due to the fact that the adjuster interface tool is not rigidly attached to the adjuster and/or mount. Adjustments to the component position and orientation can thus be made predictably by adjusting the fine control of the differential adjuster with a tool.

A differential adjuster according to some embodiments of the present invention includes an intermediate actuator sleeve with a first threaded surface, a second threaded surface, and a tool interface, wherein the first threaded surface contains threads that are a different pitch than the second threaded surface. In some embodiments, a rotationally constrained push rod that engages the second threaded surface, the push rod moving at a rate related to the difference in pitch between the first threaded surface and the second threaded surface when the intermediate actuator sleeve is rotated relative to a housing that engages the first threaded surface by a tool that engages the tool interface of the intermediate actuator sleeve.

A differential adjuster according to some other embodiments of the present invention includes an intermediate actuator sleeve including a first threaded surface and a second threaded surface of a different pitch; a main body engaged with the first threaded surface of the intermediate actuator sleeve, the main body including a threaded surface to provide a coarse adjustment; and a push-rod engaged with the second threaded surface of the intermediate actuator sleeve and coupled to the main body to restrict the relative rotational motion between the push-rod and the main body, wherein the main body includes a coarse tool interface.

A mounting device according to some embodiments of the present invention includes a device housing with a component mount to accommodate at least one component; and at least one differential adjuster coupled to the device housing in order to adjust a positioning of the component mount, wherein the at least one differential adjuster comprises: an intermediate actuator sleeve with a first threaded surface, a second threaded surface and a tool interface, wherein the first threaded surface has threads that are a different pitch than those of the second threaded surface; and a push rod that engages the second threaded surface and couples with the component mount.

A mounting device according to some other embodiments of the present invention includes a device housing with a component mount to accommodate at least one component; and at least one differential adjuster coupled to the device housing in order to adjust a positioning of the component mount, wherein the at least one differential adjuster comprises: an intermediate actuator sleeve with a first threaded surface and a second threaded surface, wherein the first threaded surface has threads that are a different pitch than those of the second threaded surface; a push rod that engages the second threaded surface and couples with the component mount; and a main body that engages the first threaded surface and the push rod such that the push rod is rotationally constrained with respect to the main body.

A method for moving a component according to the present invention includes turning a main body in a housing to affect a coarse adjustment; and turning an intermediate actuator sleeve, the intermediate actuator sleeve including a first threaded surface engaged with the main body and a second threaded surface engaged with a push rod that is rotationally constrained and that is engaged with the component, wherein an adjustment tool is utilized.

The various embodiments of the invention allow for a miniaturization of differential adjusters while retaining the ability to precisely adjust the adjuster through the use of, for example, a manual or motorized tool and/or knob. This is accomplished, in part, by displacing one or both of the knobs normally found on a typical differential adjuster and replacing the knob or knobs with a tool interface and/or tool connection located near to or inside the main body of the differential adjuster for the fine control, and located on, in, or near the end of the differential adjuster for the coarse adjustment. In addition, the tool interfaces can be made small, which allows for a further miniaturization of the overall differential adjuster. As a consequence, both the overall length and the bulk of the differential adjuster can be reduced, allowing for more precise adjustments of the differential adjuster without the consequent unwanted movement due to the size and/or bulk of typical differential adjusters found in the art. One tool that was identified as providing excellent results in terms of minimizing the transmission of unwanted motion from the user's hand to the device being adjusted was the balldriver style hex Allen wrench sold by Bondhus Corporation.

These and other embodiments are further discussed below with respect to the following figures, which are incorporated into and are a part of this disclosure.

Figure 1A:
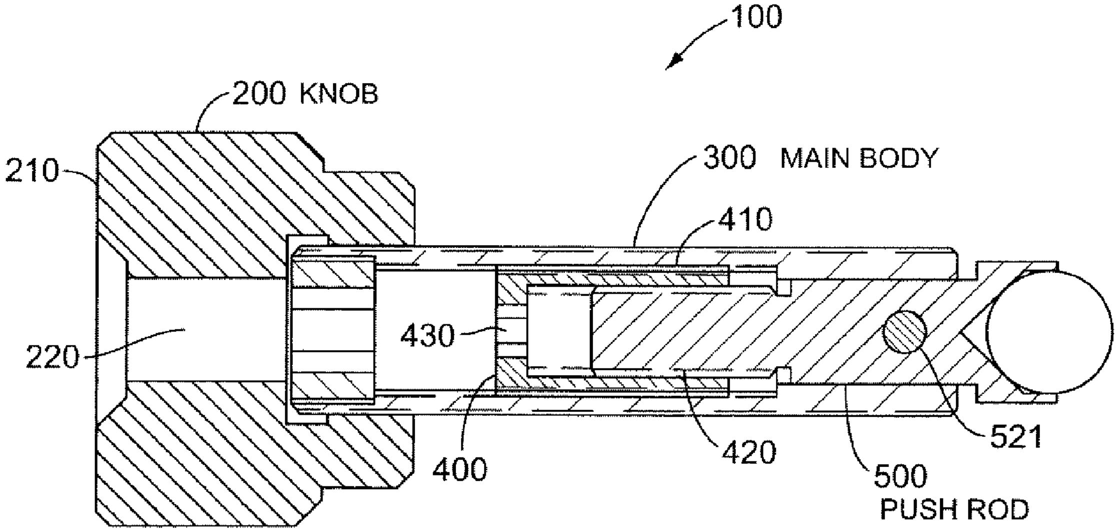
FIG. 1A shows a cross-sectional view of an embodiment of a differential adjuster according to the present invention, taken along line 1A-1A as shown in FIG. 1B.

In the drawings, elements having the same designation have substantially the same function.

DETAILED DESCRIPTION

FIG. 1A shows a side cross-sectional view of a differential adjuster 100 ("adjuster 100") according to some embodiments of the present invention. Adjuster 100 includes an intermediate actuator sleeve 400 with a first threaded surface 410 and a second threaded surface 420. A push rod 500 is coupled to second threaded surface 420 of intermediate actuator sleeve 400 and is in communication with threads on second threaded surface 420. Intermediate actuator sleeve 400 is coupled to a housing 300, which in FIG. 1A is shown as main body 300. In some embodiments, housing 300 can be any housing, including a component mount or other device.

Push rod 500 is coupled to main body 300 in order to be rotationally constrained with respect to main body 300. In the embodiment shown in FIG. 1A, push rod 500 includes a dowel pin 521 that serves to restrict its rotation with respect to main body 300. In general, any coupling between push rod 500 and main body 300 (or a housing) that constrains push rod 500 rotationally with respect to main body 300 can be utilized.

Small displacements of push rod 500, then, can be affected by rotating intermediate actuator sleeve 400 with respect to main body 300. These small displacements, resulting from the difference in pitch between threads on first surface 410 of intermediate actuator sleeve 400 and threads on second surface 420 of intermediate actuator sleeve 400, can allow for minute, precise adjustments to various optical components, for example mirrors, filters and/or lenses.

In the embodiment of differential actuator 100 shown in FIG. 1A, intermediate actuator sleeve 400 includes a tool interface 430. Actuator 400, then, can be rotated in main body 300 by inserting a tool (not shown) into tool interface 430. Tool interface 430 can be formed to accept any tool, for example an Allen wrench, screwdriver (straight, Phillips, star, or other configuration), a ball-driver, or other tool. In some embodiments, where an outside surface of intermediate actuator sleeve 400 is accessible, tool interface 430 may accommodate a wrench or socket, spanner, or other tool.

In the embodiment of intermediate actuator sleeve 400 shown in FIG. 1A, first threaded surface 410 is an external surface threaded to engage threads on an inner surface of main body 300 (or other housing). Further, second threaded surface 420 is an internal surface of intermediate actuator sleeve 400 threaded to engage threads on an outer surface of push rod 500. However, intermediate actuator sleeve 400 can include any configuration of threaded surfaces. For example, first threaded surface 410 may be on an internal surface of intermediate actuator 400 and the threads on first threaded surface 410 may engage threads on an outer surface 310 of main body 300. Further, second threaded surface 420 may be on an outside surface of intermediate actuator sleeve 400 and may engage threads on an inner surface of push rod 500.

In the embodiment shown in FIG. 1A, a knob 200 is coupled to main body 300. Main body 300 may include a threaded surface that engages threads on a housing (not shown). Such threads can be on an inner surface 320 or an outer surface 310 of main body 300. A coarse adjustment of differential adjuster 100, then, can be performed by rotating main body 300 in the housing. Knob 200 facilitates rotation of main body 300 with respect to the housing, which can provide for large net linear displacements, as would any conventional fine adjustment screw. In some embodiments, knob 200 may form part of a tool that is accommodated by a tool interface on main body 300.

Figure 1B:
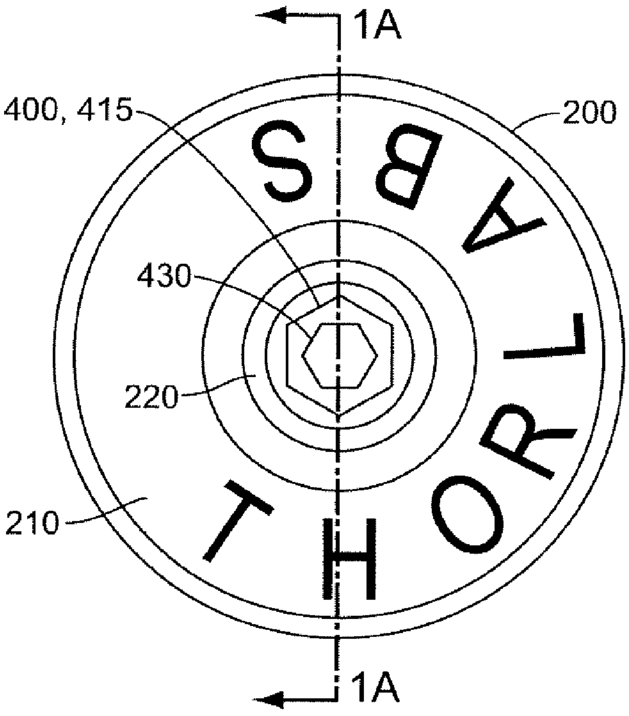
FIG. 1B shows an end view of an embodiment of the embodiment of differential adjuster shown in FIG. 1A.

FIG. 1B shows an end view of an adjuster 100 with knob 200 according to the embodiment shown in FIG. 1A. Tool interface 430 is formed in tool end 415 of intermediate actuator sleeve 400. In FIG. 1B, tool interface 430 is shown in the form of a hexagonal socket appropriate for a ball driver or an Allen wrench. However, tool interface 430 may be of any shape designed to interface with a corresponding tool (not shown), for example a slot for a flat-head screwdriver or a cross-shape for a Phillips-head screwdriver.

As is explained in more detail below, tool interface 430 allows the user to use a tool (not shown) to induce small rotations of intermediate actuator sleeve 400 within main body 300 to accomplish very fine net linear adjustments of push rod 500 with respect to main body 300 without the use of a bulky and extensive knob for that purpose.

Knob 200, which controls rotation of main body 300, may be fixedly attached to the outer surface 310 (FIG. 2A) of main body 300 (FIG. 1A) and allows for the user to rotate main body 300 (FIG. 1A) by hand for coarse adjustment of adjuster 100. In some embodiments, knob 200 may be removable and when removed exposes a tool interface formed in main body 300. As shown in FIG. 1B, knob 200 defines an opening 220 (FIG. 1A) through which the user inserts a tool (not shown) to access tool interface 430, for the purpose of making fine adjustments of adjuster 100. In another embodiment, a small fine adjuster knob (not shown) could be fixedly attached to tool end 415 of intermediate actuator sleeve 400 to provide ready access to the fine motion control.

Figure 1C:
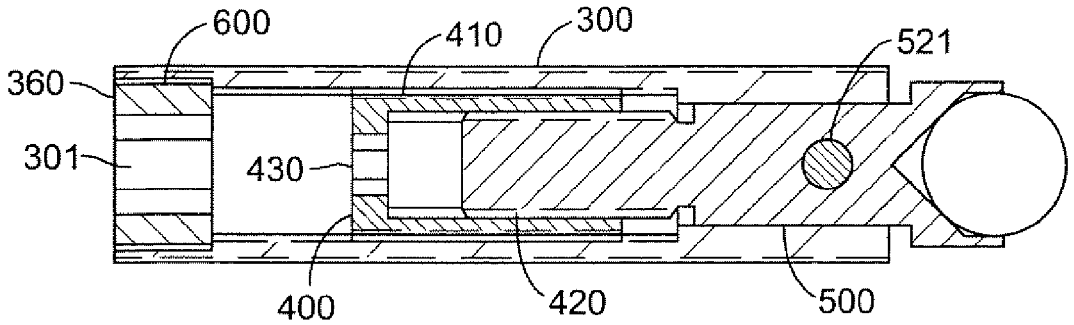
FIG. 1C shows a cross-sectional view of another embodiment of a differential adjuster according to the present invention, taken along line 1C-1C as shown in FIG. 1D.

FIG. 1C shows a side cross-sectional view of another embodiment of differential adjuster 100 according to the present invention. As described with respect to the embodiment of FIG. 1A, adjuster 100 includes intermediate actuator sleeve 400 with first threaded surface 410 engaging threads in main body 300 and second threaded surface 420 engaging threads on push rod 500. Again, intermediate actuator sleeve 400 can engage threads in any housing, an example of which is shown as main body 300.

Push rod 500 is coupled to main body 300 in order that the rotational motion of push rod 500 with respect to main body 300 is restricted. In the embodiment shown in FIG. 1C, push rod 500 includes a dowel pin 521 that serves to restrict its rotation with respect to main body 300, although any coupling between push rod 500 and main body 300 that constrains push rod 500 rotationally with respect to main body 300 can be utilized. Push rod 500, then, is constrained from rotating as intermediate actuator sleeve 400 is rotated.

Figure 1D:
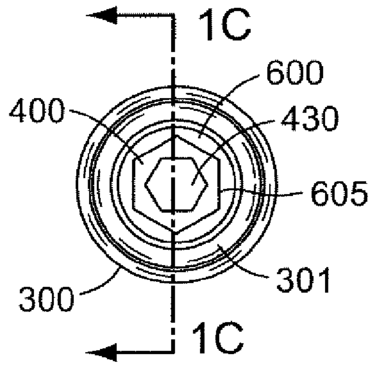
FIG. 1D shows an end view of an embodiment of the differential adjuster shown in FIG. 1C.

First threaded surface 410 of intermediate actuator sleeve 400 causes intermediate actuator sleeve 400 to translate with respect to main body 300 as intermediate actuator sleeve 400 is rotated with respect to main body 300. In some embodiments as shown in FIG. 1C, intermediate actuator sleeve 400 includes a tool interface 430 which can accommodate a tool to affect the rotation. Although, tool interface 430 can be formed to accommodate any tool, an example of a hex slot to accommodate a hex wrench is shown in FIG. 1D.

As intermediate actuator sleeve 400 is rotated in a first direction it also causes push rod 500, which is connected to intermediate actuator sleeve 400 via threads, to move further into intermediate actuator sleeve 400. The forward motion of intermediate actuator sleeve 400 and the backward motion of push rod 500 with respect to the intermediate actuator sleeve 400 results in a net linear displacement of push rod 500 with respect to main body 300. This net linear displacement of push rod 500 is determined by the difference between the thread pitch of threads on first threaded surface 410, which engage threads on main body 300, and second threaded surface 420, which engage threads on push rod 500, of intermediate actuator sleeve 400. Hence using two threads of close but differing pitch allows for small net linear displacements.

In a particular embodiment, for example, the pitch of the external threads of intermediate actuator sleeve 400 can allow for linear displacements of about 0.400 mm per revolution and the pitch of the internal threads can allow for linear displacements of about 0.375 mm per revolution thus providing for a net linear displacement of push rod 500, with respect to main body 300, of about 0.025 mm (0.400 mm minus 0.375 mm), per revolution of the intermediate actuator sleeve 400. These small displacements allow for minute, precise adjustments to various optical components, for example mirrors, filters and/or lenses.

In the embodiment shown in FIG. 1C, main body 300 defines an opening 301 in proximate end 360. The user accomplishes rotation of main body 300 by using a second tool (not shown) to interface with tool interface 605 of opening 301 for large net linear displacements, as is discussed further below.

Figure 1E:
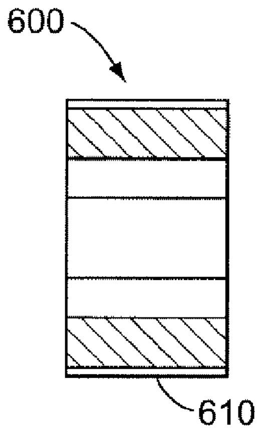
FIG. 1E shows a cross-sectional view of a plug according to one embodiment of the present disclosure, taken along line 1E-1E in FIG. 1F.
Figure 1F:
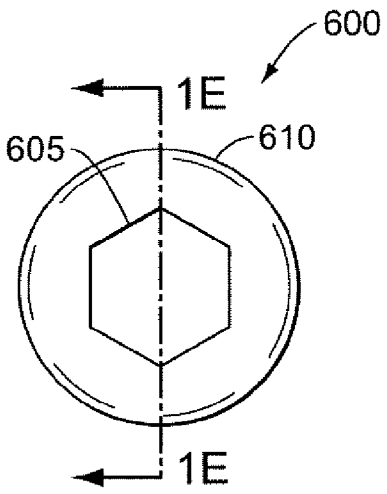
FIG. 1F shows an end view of a plug according to one embodiment of the present disclosure.

As shown in FIGS. 1E and 1F, in some embodiments, a plug 600 can be formed to screw into main body 300 on proximate end 360. Plug 600 includes an outer portion 610 and tool interface 605, which in FIGS. 1E and 1F is shown as a hex insert.

FIG. 1D shows an end view of an adjuster 100 according to embodiments of the invention as illustrated in FIG. 1C. Tool end 415 of intermediate actuator sleeve 400 contains tool interface 430 shown here in the form of a hexagonal opening. However, tool interface 430 may be formed to accommodate any corresponding tool (not shown), for example a slot for a flat-head screwdriver or a cross-shape for a Phillips-head screwdriver, an Allen wrench, and/or a ball driver. As is explained in more detail below, tool interface 430 allows the user to use a tool (not shown) to induce small rotations of intermediate actuator sleeve 400 within main body 300 to accomplish very fine net linear adjustments of push rod 500 within adjuster 100. Main body 300 includes a proximate end 360 in which an opening 301 is defined. Opening 301 is large enough in diameter to allow the tool (not shown) to pass through proximate end 360 of main body 300 to engage tool interface 430 of intermediate actuator sleeve 400.

Opening 301 can include tool interface 605 shaped to accommodate a second tool (not shown) to allow the user to rotate main body 300 for coarse adjustment, and can be a hexagonal opening to interface with a hex wrench. However, tool interface 605 may be of any shape designed to interface with a corresponding tool, for example a slot for a flat-head screwdriver, a cross shape for a Phillips head screwdriver and/or an external hex head for an opened-end or closed-end wrench or spanner wrench. As is discussed in part above, a knob 200 (shown in FIG. 1A or 1B) may be used either in place of or in addition to the second tool (not shown) used to interface with tool interface 605 to allow for coarse adjustments of main body 300. In another embodiment, a small fine adjuster knob (not shown) could be fixedly or temporarily attached to tool end 415 of intermediate actuator sleeve 400 to provide ready access to the fine motion control, while a tool can be utilized to affect coarse adjustment by tool interface 605.

Figure 1G:
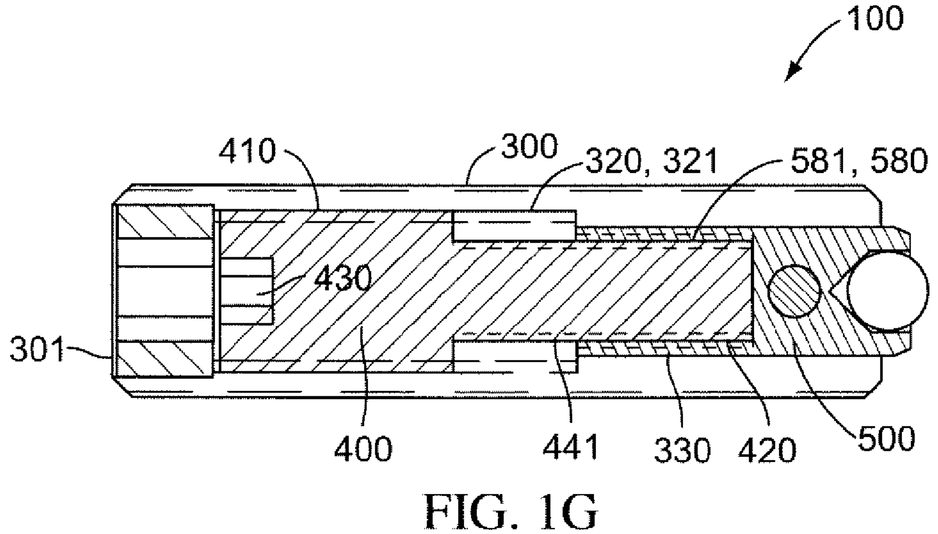
FIG. 1G shows cross-sectional view of another embodiment of a differential adjuster according to the present invention with an alternative thread arrangement, taken along a line 1C-1C as shown in FIG. 1D.

FIG. 1G shows another embodiment of adjuster 100, illustrating a different orientation of first threaded surface 410 and second threaded surface 420 of intermediate actuator sleeve 400. In the embodiment shown in FIG. 1G, both first threaded surface 410 and second threaded surface 420 of intermediate actuator sleeve 400 are formed on an external surface 441 of intermediate actuator sleeve 400. First threaded surface 410 engages threads 321 on inner surface 320 of main body 300. Second threaded surface 420 engages threads 581 on an inner surface 580 of push rod 500. The pitch of first threaded surface 410 may be coarser than the pitch of second threaded surface 420 to allow for a net forward displacement of push rod 500 within main body 300 when intermediate actuator sleeve 400 is rotated within main body 300. However, in some embodiments, the pitch of first threaded surface 410 may be finer than the pitch of second threaded surface 420 to allow for a net backward displacement of push rod 500 with respect to main body 300 with a similar rotation.

Differential adjuster 100, as shown in FIGS. 1A through 1D, can be produced with very small form factors, and therefore little weight, because of the elimination of at least one knob to affect either the coarse adjustment or differential fine adjustment. Utilizing tool interfaces to affect adjustments in differential adjuster 100 allows differential adjuster to be produced with a small form factor. Tool interfaces can be made particularly small, compared to knobs which are designed to be turned by hand, and therefore intermediate actuator sleeve 400, main body 300, and push rod 500 can be made small and short (depending on the desired travel of the adjustment).

In some embodiments of the invention, as is shown in FIG. 1C, differential adjuster 100 includes a tool interface 430 on intermediate actuator sleeve 400 and a tool interface 605 on main body 300, each accepting a tool for making an adjustment. In some embodiments, as shown in FIG. 1A, differential adjuster 100 retains knob 200 coupled to main body 300 in order to affect coarse adjustment. In some embodiments, as is discussed with FIG. 1C, a fine adjustment knob may be coupled to intermediate actuator sleeve 400 and tool interface 605 may be a wrench, spanner wrench, or the like to affect a coarse adjustment by rotating main body 300 in a housing.

Special tools with knobs may be supplied with adjuster 100. For example, in FIGS. 1C and 1D, a tool with a knob accommodated by tool interface 430 and a tool with a knob accommodated by tool interface 605 can be supplied. In that fashion, a user of differential adjuster 100 can chose to remove the tools (and knobs) and substitute other tools which allow for a differential adjuster with less weight, less length, and better control without distorting the adjustment.

Figure 2A:
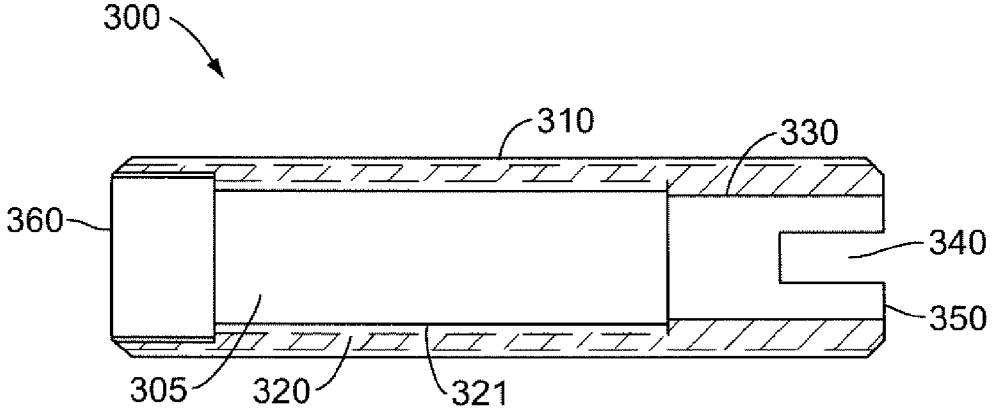
FIG. 2A is a cross-sectional side view of an embodiment of a main body of the differential adjustment apparatus shown in FIGS. 1A and 1C, taken along line 1C-1C in FIG. 1D.

FIG. 2A shows an embodiment of main body 300. Main body 300 is generally cylindrical in shape, having a proximate end 360 and a distal end 350, and including an outer surface 310. Outer surface 310 may include threads on at least a portion of its length to interface with a corresponding tapped hole defined in, for example, a mount or holder for an optical element. The threads on outer surface 310 are typically coarse, compared to the effective pitch of the differential adjuster mechanism formed by intermediate actuator sleeve 400 and push rod 500, allowing for large linear displacements of assembly 100 with respect to the mount and/or holder by rotating knob 200 (FIG. 1A). Opening 301, through tool interface 605, allows for the user to use a tool to engage intermediate actuator sleeve 400 (FIG. 1A) that is located inside main body 300. Proximate end 360 may be formed to accept a second tool.

Figure 2B:
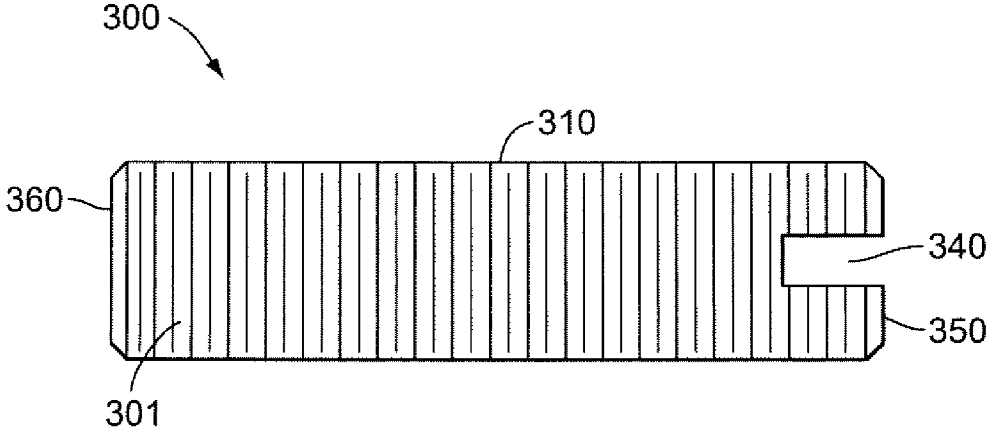
FIG. 2B is a side view of an embodiment of a main body of the differential adjustment apparatus shown in FIG. 1B, with some hidden lines removed for clarity.

FIG. 2B shows another embodiment of main body 300. Main body 300 is generally cylindrical in shape, having a proximate end 360 and a distal end 350, and including an outer surface 310. Outer surface 310 may include threads on at least a portion of its length to interface with a corresponding tapped hole defined in, for example, a mount or holder for an optical element. The threads on outer surface 310 are typically coarse, allowing for large linear displacements of assembly 100 with respect to the mount and/or holder by using a second tool (not shown) to engage tool interface 605, as is discussed above. Tool interface 605 is shaped on proximate end 360 to accommodate a second tool (not shown). In FIG. 1D, for example, tool interface 605 is shaped in the form of a hexagonal opening to allow the user to use a second tool in the form of a hex-wrench to accomplish large displacements of adjuster 100. Of course, as is discussed above, other shapes that allow the user to rotate adjuster 100 through the use of various tools (not shown) are possible.

In the embodiments shown in FIGS. 2A and 2B, the threads on outer surface 310 are meant to interface with threads in the mirror mounts (not shown) and/or to threads inside a separate housing (not shown) that can be attached to the mirror mount. In some embodiments, main body 300 may be a ¼"-80 threaded cylinder, which advances for a rough adjustment of 0.0125" (0.318 mm) translationally per revolution, and has a length of about 0.97". Other embodiments may include any thread on outer surface 310, such as, for example, 3⁄16"-100, ¼"-100, and/or M6-0.25 mm.

In the embodiments shown in FIGS. 2A and 2B, main body 300 also includes an inner surface 320 that extends through at least a portion of the length of main body 300. Inner surface 320 contains threads 321 formed on at least a portion of its length. Threads 321 may be formed, for example, by machining, thread rolling, or any of the other means appropriate to produce high quality threads. In some embodiments, inner surface 320 and threads 321 can accommodate an externally threaded M5-0.400 mm intermediate actuator sleeve 400, which advances about 0.0157" (400 μm) translationally per revolution.

In addition, some embodiments of main body 300 contain an inner bore 330 along a portion of its length to accommodate push rod 500. In some embodiments, inner bore 330 may be formed with the same diameter as inner surface 320, but some embodiments may incorporate other combinations of diameters. In some embodiments, main body 300 also contains a slot 340 located at distal end 350 that may extend about 0.155" into the main body 300 and may have a width of about 0.063". Slot 340 accommodates a dowel pin (not shown) that can restrict rotation of push rod 500 relative to main body 300. Some embodiments of main body 300 may include other configurations for restricting the rotation of push rod 500 with respect to main body 300 while allowing for net linear displacements. For example, instead of a slot 340, a keyway machined into inner bore 330 with a corresponding key inserted into the push rod 500 could also restrict the rotation of push rod 500 relative to main body 300.

Figure 3:
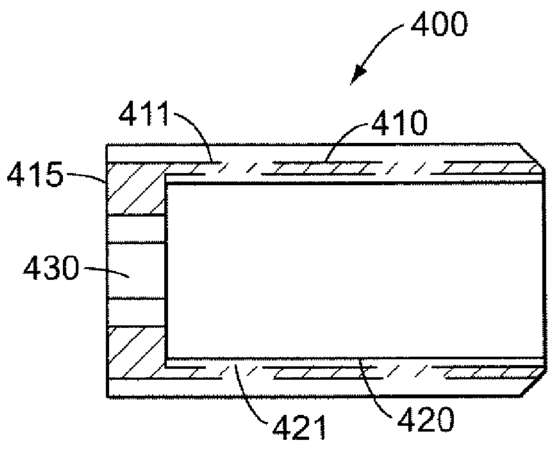
FIG. 3 is a side view of an embodiment of an intermediate actuator sleeve of the differential adjustment apparatus shown in FIG. 1A or 1C, taken along line 1C-1C in FIG. 1D.

FIG. 3 shows an example of intermediate actuator sleeve 400. Intermediate actuator sleeve 400 can be generally cylindrical in shape and includes a first threaded surface 410, a second threaded surface 420, and a tool interface 430. In some embodiments, intermediate actuator sleeve 400 may be about 0.34" in length. Threads 411 can be formed on first threaded surface 410 along substantially the entire length of intermediate actuator sleeve 400. Threads 411 on first threaded surface 410 engage threads 321 formed on inner surface 320 of main body 300. Intermediate actuator sleeve 400, then, can be screwed into place inside of main body 300. Alternatively, threads 411 can be screwed into a correspondingly tapped access in any housing to provide differential adjustment without main body 300.

Threads 421 are formed on second threaded surface 420 of intermediate actuator sleeve 400, at least through a portion of the length of second threaded surface 420. Threads 421 can engage threads 571 formed on outside surface 570 of interface section 510 of push rod 500 (see FIGS. 4A and 4B). Threads 421 formed on second threaded surface 420 can have a finer pitch than threads 411 formed on first threaded surface 410 in order to allow for a net forward movement of push rod 500. However, threads 421 contained on second threaded surface 420 can be of a coarser pitch than threads 411 contained on first threaded surface 410 to allow for a net backward movement of push rod 500, depending on the desired translational motion of the differential adjuster for a given direction of rotation of the intermediate actuator sleeve 400.

Tool interface 430 can be machined into one end of intermediate actuator sleeve 400 in the form of a hexagonal relief to accommodate a hex-wrench, a Phillips relief to accommodate a Phillips screwdriver, a straight slot to accommodate a straight screwdriver, or any other shape to accommodate a tool. In some embodiments, tool interface 430 may be a relief for a 5/64" hex and may extend into the interior of intermediate actuator sleeve 400, or may end before then. The user, then, can rotate intermediate actuator sleeve 400 within main body 300, thereby allowing for fine adjustment of assembly 100. Tool interface 430 can also be formed by any method, including but not limited to, machining, forging and/or casting. Intermediate actuator sleeve 400 can be inserted into any housing, which is any hole drilled and tapped to accommodate the threads 411 on the first threaded surface 410.

Figure 4A:
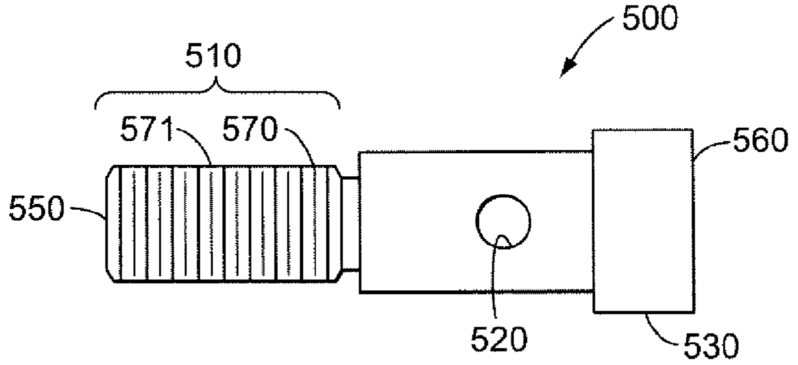
FIG. 4A is a side view of an embodiment of a push rod of the differential adjustment apparatus shown in FIG. 1A or 1C.
Figure 4B:
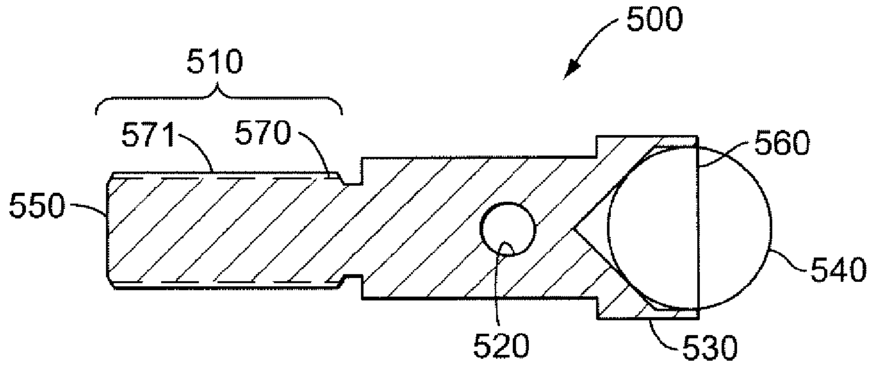
FIG. 4B is a cross-sectional view of an embodiment of a push rod of the differential adjuster shown in FIG. 1A or 1C, taken along line 1C-1C in FIG. 1D.

FIGS. 4A and 4B show embodiments of push rod 500. Push rod 500 is generally cylindrical in shape and has a proximate end 560 and a distal end 550. Push rod 500 includes an interface section 510 located at distal end 550. In some embodiments, interface section 510 can be machined out of push rod 500, or alternatively cast, forged and/or machined as a separate part and attached to push rod 500 through adhesion, welds and/or suitable mechanical fasteners. In some embodiments, push rod 500 may be about 0.675" long and interface section 510 may be about 0.29" in length. Threads 571 can be formed on outside surface 570 of interface section 510 to engage with corresponding threads 421 on second threaded surface 420 of intermediate actuator sleeve 400. In some embodiments, threads 571 can be M3-0.375 threads, which provides a translational motion of about 0.015" (375 μm) per revolution.

Push rod 500 defines a passage 520 through its diameter, perpendicular to its long axis. In some embodiments, passage 520 is located about 0.22" from proximate end 560 of push rod 500 and may have a diameter of about 0.063". Passage 520 accommodates a dowel pin (not shown) that is substantially longer than the diameter of push rod 500. The dowel pin engages slot 340 of main body 300 to restrict rotation of push rod 500 with respect to main body 300, as was discussed above. Therefore, push rod 500 can advance translationally along the direction of its long axis when a user rotates intermediate actuator sleeve 400 within main body 300. Of course, one skilled in the art will recognize that many other ways exist to restrain rotation of push rod 500 with respect to main body 300, while allowing push rod 500 to move linearly. For example, push rod 500 may have pins attached to its exterior surface through the use of welds and/or an adhesive.

Push rod 500 may contain a holder section 530 on proximate end 560. Holder section 530 can be larger in diameter than other sections of push rod 500 to accommodate a contact device 540, for example a mass produced hardened steel ball bearing (see FIG. 4B). The contact device 540 can be of any convenient size, the purpose being to provide a single point of contact between push rod 500 and the part being positioned and can be made of many possible materials and shapes. In some embodiments, holder section 530 may be about 0.21" in diameter and about 0.115" in length. Contact device 540 is attached to the holder section and provides a means for which to contact the optical component to be adjusted. Contact device 540 can be held in holder section 530, for example, by pressure fitting contact device 540 into holder section 530, by welding, adhesives, and/or other methods. FIG. 4B shows contact device 540 in the form of a sphere which provides a single point of contact. However, other shapes for contact device 540 are apparent to those skilled in the art, including, but not limited to, rectangular, triangular and/or rod-shaped devices. In some embodiments, contact device 540 is a sphere that may be about 0.1875" in diameter and may extend past proximate end 560 by about 0.086".

Figure 5:
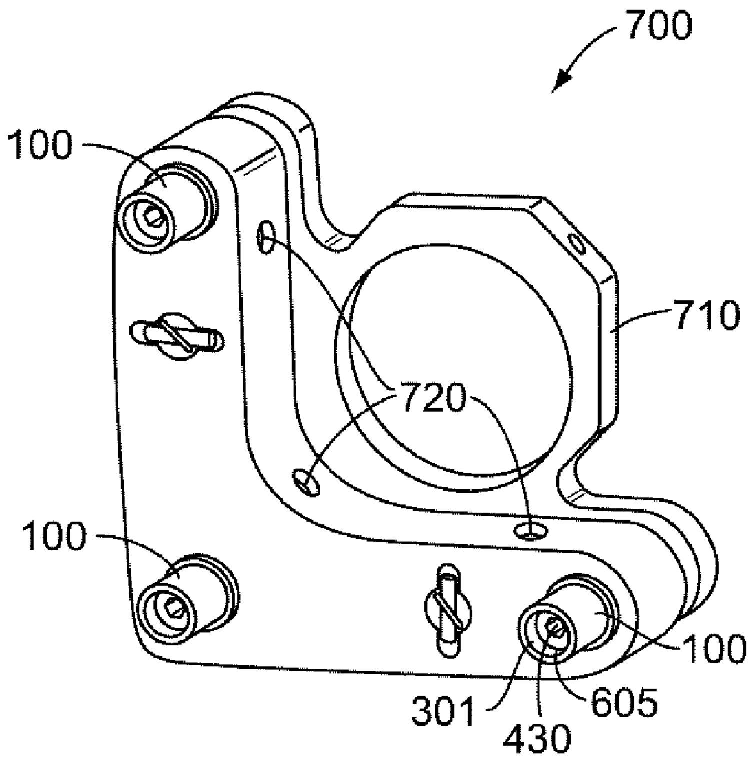
FIG. 5 is a perspective view of an embodiment of a component mount including the differential adjusters shown in FIG. 1A or 1C.

FIG. 5 shows an embodiment of a component mount 700 including a component holder 710 and a plurality of differential adjusters 100 according to the present invention. Component mount 700, also known as an element mount, includes at least one mount threaded surface (not shown) that can act as a housing to accommodate at least one adjuster 100. Adjuster 100 includes a tool interface 430 for affecting fine adjustment and a tool interface 605 for affecting coarse adjustment. Tool interface 430 and tool interface 605 are each shown as hex interfaces for accepting an Allen wrench or ball driver tool. The orientation of component holder 710, then, is affected by both the coarse adjustment and fine adjustment of adjusters 100. In some embodiments, component mount 700 also includes locks 720 that can lock the rotation of main body 300 of differential adjuster 100. In that fashion, a user may prevent turning main body 300 in component mount 700 when a fine adjustment is attempted.

In operation according to the embodiment shown in FIG. 1A, a user rotates knob 200 for coarse adjustment of assembly 100 within a mount for an optical component. The user then would lock adjuster 100 using lock 720 built into component mount 700 to prevent inadvertent coarse motion caused by movement of adjuster 100 as fine control is actuated. Next, user rotates intermediate actuator sleeve 400 within main body 300 by using a tool, such as a hex wrench, to engage tool interface 430 located on intermediate actuator sleeve 400. Each rotation of intermediate actuator sleeve 400 will advance it a certain linear distance. As intermediate actuator sleeve 400 rotates within main body 300, push rod 500 is not able to rotate with respect to main body 300 because the dowel pin extending through passage 520 of push rod 500 butts up against slot 340 of main body 300. As a consequence, interface section 510 of push rod 520 engages threads on inner surface 420 of intermediate actuator sleeve 400 and causes push rod 500 to move backwardly into intermediate actuator sleeve 400. The resulting net linear displacement depends, therefore, on the difference between the thread pitch of outer surface 410 and inner surface 420 of intermediate actuator sleeve 400. In another embodiment, rotation of the adjuster can be accomplished by a miniature motor drive, for example a Piezo-electric, traditional electrical, or micro electromechanical systems (MEMS) motor.

A component mount according to the present invention includes a component holder and at least one differential adjuster according to the present invention coupled to the component holder. Component holders typically have mounting provisions located in their bases to allow for attachment to an optics table, optical assembly, or precision mechanical system support structures. Of course, one skilled in the art will recognize that other means for attaching holders and/or mounts to an optics table or optical assembly exist, including the use of clamps, adhesives, magnets, and/or welds. A mount that is suitable for this purpose includes, but is not limited to, part No. KX1, available from ThorLabs, Inc. located in Newton, N.J.

Figure 6:
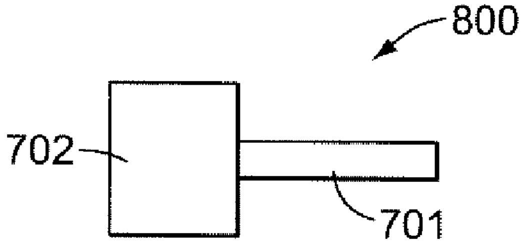
FIG. 6 shows an embodiment of a tool that can be utilized with embodiments of tool interfaces.

FIG. 6 shows an example of a tool 800 that can be utilized in a tool interface (not shown) as described above. The tool interface arranged to accommodate tool 701 can be any of the interfaces discussed above. As such, tool end 701 can be a hex driver or Allen wrench, a ball driver, a screw driver, or any other tool. In some embodiments, tool end 701 can be a spanner wrench or other wrench. In some embodiments, tool 800 includes a tool driver 702 that allows the user to rotate tool end 701. As such, tool driver 702 can be a handle or knob large enough to allow a user to rotate tool end 701 in a tool interface. In some embodiments, tool driver 702 may be a remotely controlled motor that allows the user to rotate tool end 701 as desired without approaching or directly touching adjuster 100.

It will be apparent to those skilled in the art that various modifications and variations can be made in the above-described embodiments of the present invention without departing from the scope and spirit of the invention. Thus, it is intended that the present invention covers such modifications and variations provided they come within the scope of the appended claims and their equivalents.

What is claimed is:

1. A differential adjuster, comprising:

an intermediate actuator sleeve with a first threaded surface, a second threaded surface, and a tool interface, wherein the first threaded surface contains threads that are a different pitch than the second threaded surface; and a push rod that engages the second threaded surface, the push rod moving at a rate related to the difference in pitch between the first threaded surface and the second threaded surface when the intermediate actuator sleeve is rotated relative to a housing that engages the first threaded surface by a tool that engages the tool interface of the intermediate actuator sleeve, wherein a dowel pin engages both the housing and the push rod, thereby preventing the push rod from rotating with respect to the housing.

2. The differential adjuster of claim 1, wherein the first threaded surface is an external threaded surface and the second threaded surface is an internal threaded surface.

3. The differential adjuster of claim 1, wherein the first threaded surface and the second threaded surface are both external threaded surfaces.

4. The differential adjuster of claim 1, wherein the first threaded surface is an internal threaded surface and the second threaded surface is an external threaded surface.

5. The differential adjuster of claim 1, wherein the housing is a main body.

6. The differential adjuster of claim 5, wherein the main body is less than 1 inch in length.

7. The differential adjuster of claim 6, wherein the main body includes a main body tool interface for allowing a second tool to rotate the main body.

8. The differential adjuster of claim 6, wherein the main body includes a threaded surface.

9. The differential adjuster of claim 8, wherein the main body engages a mount threaded surface in a component mount.

10. The differential adjuster of claim 9, wherein the main body threaded surface provides a coarse adjustment.

11. The differential adjuster of claim 10, wherein the main body is less than 1 inch in length.

12. The differential adjuster of claim 11, wherein the main body is less than 0.25 inch in diameter.

13. The differential adjuster of claim 10, further comprising a knob coupled to the main body to provide a coarse adjustment, the knob defining an opening allowing access to the tool interface.

14. The differential adjuster of claim 10, wherein the main body includes a coarse tool interface to affect the coarse adjustment.

15. The differential adjuster of claim 14, wherein the coarse tool interface accommodates a coarse adjustment tool, the coarse adjustment tool chosen from the group consisting of a spanner wrench, a socket, a screw driver, a ball driver, and an Allen wrench.

16. The differential adjuster of claim 15, wherein the coarse adjustment tool includes a knob or handle.

17. The differential adjuster of claim 1, wherein the tool interface accommodates a differential adjustment tool, the differential adjustment tool chosen from the group consisting of a screw driver, a ball driver, and an Allen wrench.

18. The differential adjuster of claim 17, wherein the differential adjustment tool includes a knob or handle.

19. The differential adjuster of claim 1, wherein the housing is a component mount or positioner that engages the first threaded surface of the intermediate actuator sleeve.

20. The differential adjuster of claim 1, wherein the push rod includes a ball bearing.

21. A differential adjuster, comprising:

an intermediate actuator sleeve including a first threaded surface and a second threaded surface of different pitch;

a main body engaged with the first threaded surface of the intermediate actuator sleeve, the main body including a threaded surface to provide a coarse adjustment; and a push-rod engaged with the second threaded surface of the intermediate actuator sleeve and coupled to the main body to restrict the relative rotational motion between the push-rod and the main body, wherein the main body includes a coarse tool interface, wherein a dowel pin engages both the main body and the push rod, thereby constraining the push rod from rotating with respect to the main body.

22. The differential adjuster of claim 21, wherein the first threaded surface of the intermediate adjuster sleeve is an external threaded surface and the second threaded surface of the intermediate adjuster sleeve is an internal threaded surface.

23. The differential adjuster of claim 21, wherein the first threaded surface of the intermediate adjuster sleeve and the second threaded surface of the intermediate adjuster sleeve are both external threaded surfaces.

24. The differential adjuster of claim 21, wherein the first threaded surface of the intermediate adjuster sleeve is an internal threaded surface and the second threaded surface of the intermediate adjuster sleeve is an external threaded surface.

25. The differential adjuster of claim 21, wherein the main body is less than 1 inch in length.

26. The differential adjuster of claim 25, wherein the main body is less than 0.25 inch in diameter.

27. The differential adjuster of claim 21, wherein the threaded surface of the main body engages threads in a component mount or positioning device.

28. The differential adjuster of claim 21, wherein the coarse tool interface accommodates a coarse adjustment tool, the coarse adjustment tool chosen from the group consisting of a spanner wrench, a socket, a screw driver, a ball driver, and an Allen wrench.

29. The differential adjuster of claim 28, wherein the coarse adjustment tool includes a knob or handle.

30. The differential adjuster of claim 21, wherein the intermediate actuator sleeve is coupled to a knob to affect a differential adjustment.

31. The differential adjuster of claim 21, wherein the coarse tool interface accommodates a spanner wrench.

32. The differential adjuster of claim 21, wherein the intermediate actuator sleeve includes a tool interface.

33. The differential adjuster of claim 32, wherein the tool interface of the intermediate actuator sleeve accommodates an adjustment tool, the adjustment tool chosen from the group consisting of a spanner wrench, a socket, a screw driver, a ball driver, and an Allen wrench.

34. The differential adjuster of claim 33, wherein the differential adjustment tool includes a knob or handle.

* * * * *